US011757935B2

(12) United States Patent
Sharma et al.

(10) Patent No.: US 11,757,935 B2
(45) Date of Patent: Sep. 12, 2023

(54) ENDPOINT SECURITY MECHANISM TO DETECT IP THEFT ON A VIRTUAL MACHINE MOBILITY IN SWITCH FABRIC

(71) Applicant: Cisco Technology, Inc., San Jose, CA (US)

(72) Inventors: Govind Prasad Sharma, Union City, CA (US); Eshwar Rao Yedavalli, Fremont, CA (US); Mohammed Javed Asghar, Dublin, CA (US); Ashwath Kumar Chandrasekaran, San Jose, CA (US); Swapnil Mankar, San Jose, CA (US); Umamaheswararao Karyampudi, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/736,748

(22) Filed: May 4, 2022

(65) Prior Publication Data

US 2022/0263865 A1 Aug. 18, 2022

Related U.S. Application Data

(62) Division of application No. 16/396,096, filed on Apr. 26, 2019, now Pat. No. 11,368,484.

(51) Int. Cl.
*H04L 9/40* (2022.01)
*G06F 9/455* (2018.01)
(Continued)

(52) U.S. Cl.
CPC ...... *H04L 63/1483* (2013.01); *G06F 9/45558* (2013.01); *H04L 61/103* (2013.01);
(Continued)

(58) Field of Classification Search
CPC .............. H04L 63/1483; H04L 61/103; H04L 61/6022; G06F 2009/4557
See application file for complete search history.

(56) References Cited

U.S. PATENT DOCUMENTS 7,516,487 B1 * 4/2009 Szeto ................. H04L 63/0263
726/13
7,523,485 B1 * 4/2009 Kwan ................. H04L 63/1466
726/2

(Continued)

OTHER PUBLICATIONS

Shelby et al., "RFC 6775—Neighbor Discovery Optimization for IPv6 over Low-Power Wireless Personal Area Networks (6LoWPANs)", Nov. 2012, Internet Engineering Task Force, https://www.rfc-editor.org/rfc/rfc6775.*

(Continued)

*Primary Examiner* — Douglas B Blair
(74) *Attorney, Agent, or Firm* — Edell, Shapiro & Finnan, LLC

(57) ABSTRACT

Methods to secure against IP address thefts by rogue devices in a virtualized datacenter are provided. Rogue devices are detected and distinguished from a migration of an endpoint in a virtualized datacenter. A first hop network element in a one or more network fabrics intercepts a request that includes an identity of an endpoint and performs a local lookup for the endpoint entity identifier. Based on the lookup not finding the endpoint entity identifier, the first hop network element broadcasts a message such as a remote media access address (MAC) query to other network elements in the one or more network fabrics. Based on the received response, which may include an IP address associated with the MAC address, the first hop network element performs a theft validation process to determine whether the request originated from a migrated endpoint or a rogue device.

20 Claims, 12 Drawing Sheets

(51) Int. Cl.
  *H04L 61/103* (2022.01)
  *H04L 101/622* (2022.01)
(52) U.S. Cl.
  CPC ...... *H04L 63/10* (2013.01); *G06F 2009/4557* (2013.01); *G06F 2009/45595* (2013.01); *H04L 2101/622* (2022.05)

(56) References Cited

U.S. PATENT DOCUMENTS

| | | | | |
|---|---|---|---|---|
| 8,107,396 | B1* | 1/2012 | Sharma | H04L 61/103 370/254 |
| 8,893,271 | B1 | 11/2014 | Sharma | |
| 11,368,484 | B1* | 6/2022 | Sharma | H04L 63/1483 |
| 2007/0118567 | A1* | 5/2007 | Isokawa | H04L 63/145 |
| 2008/0195700 | A1* | 8/2008 | Jonsson | H04L 67/104 709/203 |
| 2010/0107162 | A1* | 4/2010 | Edwards | H04L 45/58 718/1 |
| 2013/0275592 | A1* | 10/2013 | Xu | H04L 63/20 709/225 |
| 2014/0325651 | A1* | 10/2014 | Kim | H04L 63/1466 726/23 |
| 2015/0052614 | A1* | 2/2015 | Crowell | G06F 21/53 726/25 |
| 2015/0163192 | A1* | 6/2015 | Jain | H04L 43/0823 370/255 |
| 2016/0323245 | A1* | 11/2016 | Shieh | H04L 63/20 |
| 2016/0350144 | A1* | 12/2016 | Lu | G06F 9/45558 |
| 2017/0104630 | A1* | 4/2017 | Shelton | H04L 61/103 |
| 2018/0027012 | A1* | 1/2018 | Srinivasan | H04L 63/1416 726/4 |
| 2019/0034226 | A1* | 1/2019 | Gao | G06F 9/45558 |
| 2019/0124093 | A1* | 4/2019 | Sharma | H04L 49/70 |
| 2020/0036675 | A1* | 1/2020 | Tarasuk-Levin | G06F 9/45558 |

OTHER PUBLICATIONS

Z. Shelby, Ed. et al., "Neighbor Discovery Optimization for IPv6 over Low-Power Wireless Personal Area Networks (6LoWPANs)", Internet Engineering Task Force (IETF), Request for Comments: 6775, Updates: 4944, Category: Standards Track, ISSN: 2070-1721, Nov. 2012, 55 pages.

* cited by examiner

630

632
RECEIVE, BY A FIRST NETWORK ELEMENT IN A NETWORK FABRIC, A FIRST REQUEST MESSAGE INCLUDING AN ENDPOINT ENTITY IDENTIFIER ASSOCIATED WITH AN ENDPOINT ENTITY, THE FIRST REQUEST MESSAGE BEING TRIGGERED BY A SECOND NETWORK ELEMENT IN THE NETWORK FABRIC RECEIVING A MULTICAST REVERSE ADDRESS RESOLUTION PROTOCOL (RARP) REQUEST

634
PERFORM, BY THE FIRST NETWORK ELEMENT, A LOOKUP IN A LOCAL DATABASE, BASED ON THE ENDPOINT ENTITY IDENTIFIER

636
BASED ON THE LOOKUP INDICATING THAT THE ENDPOINT ENTITY IDENTIFIER IS FOUND IN THE LOCAL DATABASE, BROADCASTING A SECOND REQUEST MESSAGE WHICH IS A PROBE TO THE ENDPOINT ENTITY SO AS TO TRIGGER A THEFT VALIDATING PROCESS BY THE SECOND NETWORK ELEMENT BASED ON A RESPONSE TO THE SECOND REQUEST MESSAGE FROM THE ENDPOINT ENTITY

FIG.7

ENDPOINT SECURITY MECHANISM TO DETECT IP THEFT ON A VIRTUAL MACHINE MOBILITY IN SWITCH FABRIC

CROSS-REFERENCE TO RELATED APPLICATION

This application is a divisional application of U.S. patent application Ser. No. 16/396,096, entitled "ENDPOINT SECURITY MECHANISM TO DETECT IP THEFT ON A VIRTUAL MACHINE MOBILITY IN SWITCH FABRIC," filed on Apr. 26, 2019, the entirety of which is hereby incorporated by reference in its entirety.

TECHNICAL FIELD

The present disclosure relates to computer networks.

BACKGROUND

In today's virtual computing environments, cloud data services are prevalent. Cloud data services allow for use of a network of servers that may be hosted in a remote datacenter, to store and process data on behalf of users on demand. Cloud data services provide for sharing resources in an efficient, low cost manner.

To keep up with the increasing demand of cloud data services, cloud computing is also deployed to virtualize datacenters. A virtual datacenter has a potentially unlimited capacity because the physical hardware servers are virtualized. In a virtualized datacenter, the endpoints are no longer the physical hardware servers. Instead, virtual machines (VMs) are the endpoints. A VM is a software emulation of a computer system that includes an operation system (OS). VMs are hosted by various physical servers and can migrate between physical servers in a virtual datacenter, thereby accommodating the variable and expansive nature of cloud data services.

BRIEF DESCRIPTION OF THE DRAWINGS

FIG. 7 is a flowchart illustrating a method of triggering a theft validation process of a virtual machine IP address in a virtualized datacenter, according to an example embodiment.

DESCRIPTION OF EXAMPLE EMBODIMENTS

Overview

Figure 1:
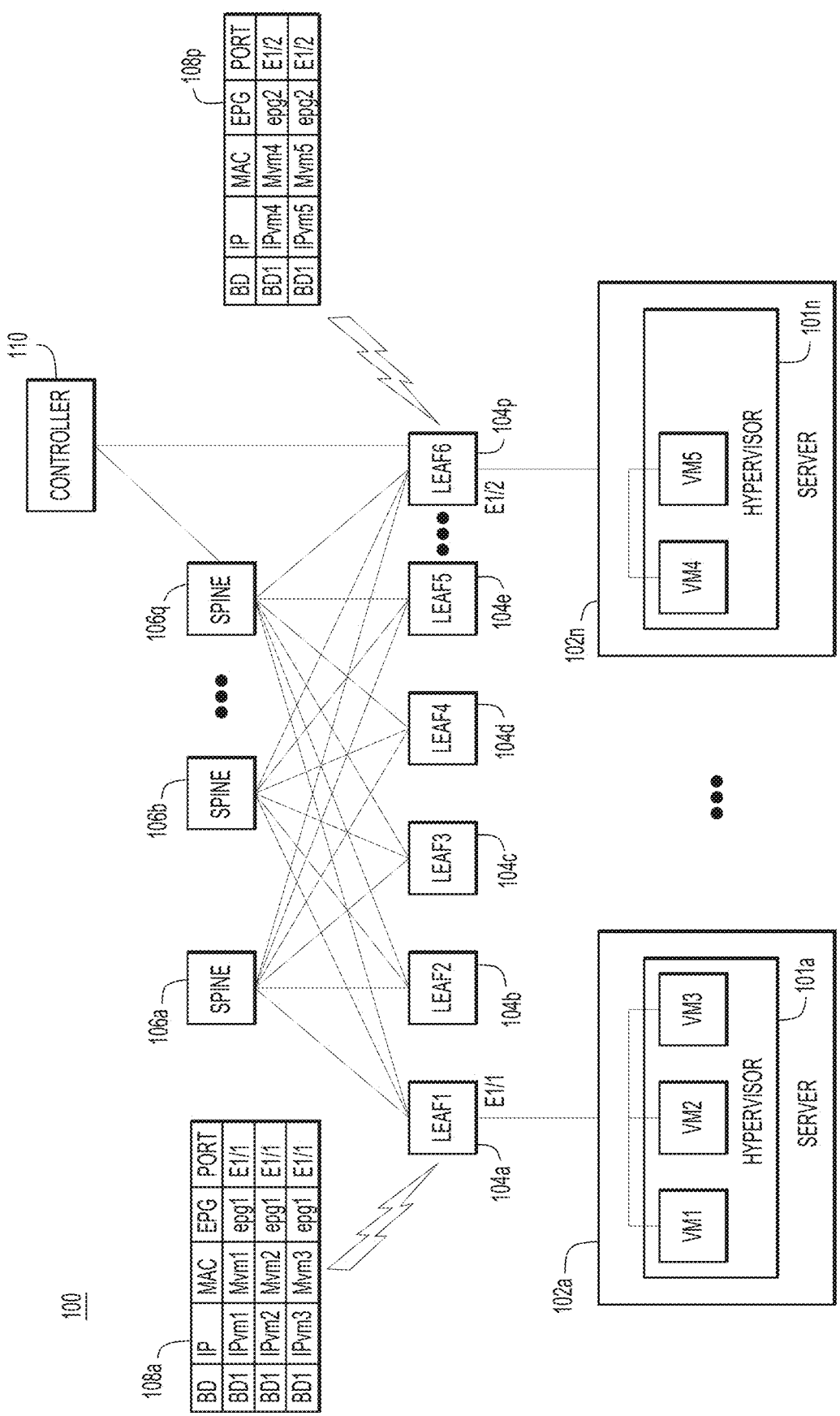
FIG. 1 is a block diagram illustrating an operating environment for providing theft detection in a virtualized datacenter network, according to an example embodiment.

Briefly, methods to secure against IP address thefts by rogue devices or processes in a virtualized datacenter are provided. In these methods, rogue devices or processes are detected and distinguished from a legitimate migration of a virtualized endpoint (e.g., a virtual machine) in a virtualized datacenter.

Further, methods are provided to detect a movement of endpoints in a virtualized datacenter so as to trigger IP theft validation processing. In these methods, a first hop network element in a one or more network fabrics intercepts a request that includes an identity of an endpoint. The first hop network element performs a local lookup for an endpoint entity identifier. Based on the lookup not finding the endpoint entity identifier, the first hop network element broadcasts a message, such as a remote media access address (MAC) query, to other network elements in the one or more network fabrics. Based on the received response, which may include an IP address associated with the MAC address, the first hop network element performs a theft validation process to determine whether the request originated from a migrated endpoint (e.g., a virtual machine) or a rogue device or process. The reply message is sent by the endpoint in response to a broadcast probe request sent from another network element, among the plurality of network elements, which found the endpoint identifier in a local database of the another network element as a result of the remote MAC address query.

Example Embodiments

In an example embodiment, a First Hop Security (FHS) solution is responsible to secure an endpoint against IP address thefts by rogue devices or processes. The FHS solution operates by intercepting Dynamic Host Configuration Protocol (DHCP) messages, address resolution protocol (ARP) messages and network discovery (ND) protocol messages exchanged between endpoints and fabric switches, such as software defined network (SDN) switches, and gleaning information (credentials) to build a distributed secure endpoint cache in the fabric. The gleaned credentials of the secured endpoint become anchored to the corresponding switch physical ingress ports where the credentials are learned and subsequent endpoint communications are limited only via the anchor switch ports. The secured endpoints credentials are also used by the FHS solution to track the liveliness of the endpoints to keep them active in the database and to perform IP theft validation checks to prevent rogue devices from stealing IP addresses and MAC addresses and performing malicious activities using the stolen IP addresses.

The FHS solution uses the endpoint's Source IP address, Source MAC Address, Endpoint Group (EPG) it belongs to and its Layer 2 Bridge Domain as the credentials for its identity.

A theft detection process that is performed by FHS solution may operate as follows.

First, a network element, such as an ingress leaf switch in a leaf-spine switch architecture, receives an ARP or ND message from an endpoint.

Second, the network element looks for the endpoint entry is in its secure local cache. If the endpoint entry is found and credentials gleaned from the packet matches the credentials in the cache, the ARP or ND message is allowed and forwarded to its destination. On the other hand, if the endpoint is already secured (present in the local cache) and the packet credentials do not match the secured credentials, the packet may be dropped or further checks may be performed.

For example, the packet may be dropped and an IP theft violation may be raised based on the ARP or ND message carrying a different source MAC address, such as the sender's MAC attribute in an ARP message or Source Link Layer Address (SSLA) Optional attribute in a neighbor solicitation (NS) message, from the one that was secured in the local cache.

On the other hand, a further check is employed when the physical port and/or EPG identifier carried in the packet is different from the one secured in the local cache. In this case, the network element sends a unicast probe (ARP or ND-NS message) to the endpoint's old location (via old port and/or old EPG identifier). If the endpoint responds from the old location, the original ARP or ND message is dropped and an IP theft violation is raised. If the endpoint does not respond, that means that the endpoint is now genuinely moved to a new location and the endpoint is now secured to the new location credentials (physical port/EPG) and the subsequent ARP or ND message received from the new location is allowed and will be forwarded to its destination as the packet credentials will match the ones secured in the local cache.

If the endpoint is not secured (not present in the secure cache), then the local switch broadcasts an endpoint remote query message (such as a customized Duplicate Address Request DAR, defined in RFC 6775) in the entire fabric where the endpoint bridge domain is deployed. All network elements, such as leaf switches in the fabric, that have the bridge domain deployed will receive this endpoint remote query message and perform a lookup in their local secured caches. If the endpoint is secured on the leaf switch, that leaf switch sends a unicast probe (an ARP or a NS request) to the endpoint's old location (on the local port and EPG). Based on the endpoint responding to the probe message from its old location, it can be learned that the secured endpoint is still active at its old location and a theft attempt is made by a rogue endpoint on the DAR originating leaf switch. Thus, the leaf switch raises an IP theft violation. It also sends back a message confirmation (such as a Duplicate Address Confirmation (DAC), defined in RFC 6775) to the DAR originating leaf switch indicating that the endpoint is already present at its old secure location on the remote leaf switch sending the DAC. On the other hand, if the endpoint does not respond to the probe, the endpoint is no longer active at its old location. As such, a genuine endpoint move is detected and the leaf switch silently ignores the receipt of the DAR request. The DAR originating leaf switch times out waiting for a DAR response and secures the endpoint on the DAR originating leaf switch thereafter. Any subsequent ARP or ND messages are allowed from the leaf switch port where the endpoint is secured.

In virtualized datacenters, the endpoints are VMs that can move within or across virtualized datacenters using hot VM migration such as vMotion. Detecting IP theft becomes difficult because the VM migration does not trigger ARP or ND communications.

FIG. 1 is a block diagram illustrating a virtualized datacenter network 100 in which techniques are provided for detecting IP address theft, according to an example embodiment. As shown in FIG. 1, the virtualized datacenter network 100, includes multiple servers 102a-102n that may run a respective hypervisor 101a-101n, which in turn hosts various VMs. The number of servers and hypervisors depicted in FIG. 1 is provided by way of an example and not by way of a limitation. The number of VMs may also vary. FIG. 1 depicts VM1, VM2, VM3, VM4, and VM5 by way of an example and not by way of a limitation. In an example embodiment depicted in FIG. 1, the server 102a runs VM1, VM2, and VM3, via hypervisor 101a, and the server 102n runs VM4 and VM5, via the hypervisor 101n.

The virtualized datacenter network may include a switch fabric consisting of a number of network elements, such as datacenter switches, being controlled by a network controller 110. The network controller 110 may be connected to each and every switch in the fabric and manages or controls configurations of the switches in the virtualized datacenter network 100. The switches may be organized into multiple levels, such as in a leaf-spine architecture that includes leaf switches and spine switches in which all the leaf switches are connected to all of the spine switches. The leaf switches are shown at reference numerals 104a-104p. The leaf switches 104a-104p provide network connectivity to the servers 102a-102n and respectively to the VMs that are hosted by the servers 102a-102n. The switches 104a-104p are connected to the servers 102a to 102n via physical switch ports. The leaf switches 104a-104p may implement Layer 2 bridging and Layer 3 routing functions utilizing the local secure databases 108a-108p stored in a cache of a respective leaf switch. The database 108a is stored in a local cache of the leaf switch 104a and the database 108p is stored in a local cache of the leaf switch 104p. The databases 108a and 108p store data including a bridge domain identifier, an IP address, a MAC address, an EPG identifier, and a port identifier. Although in an example embodiment depicted in FIG. 1, only one server 102a is connected to the first leaf switch 104a, this is by way of an example. The number of servers 102a-102n connected to each leaf switch may vary widely depending on a particular configuration of the virtual datacenter network 100. Further, although an example embodiment describes leaf switches and spine switches, one of ordinary skill in the art would readily appreciate that the techniques presented herein are applicable to network architectures other than the leaf-spine architecture shown in FIG. 1.

Each of the leaf switches 104a-104p is connected to each of spine switches 106a-106q. The number of spine switches may vary widely depending on a particular configuration of the virtual datacenter network 100. The spine switches 106a-106q switch packets between various leafs switches 104a-104p.

The leaf switches 104a-104p implement most of the protocol functions for routing and forwarding packets such as network discovery protocols and theft detection. The leaf switches 104a-104p are responsible for granting or denying access to the virtual datacenter network 100 by various VMs. The leaf switches 104a-104p are configured to detect IP address thefts, such as attempts by a rogue server to steal an IP address of an existing VM. A rogue server or a VM may listen to the conversations (intercept exchange of packets) and use information obtained from the packets to attack and steal resources of the virtual datacenter network 100. The leaf switches 104a-104p are responsible for blocking these attempts by executing the aforementioned FHS process.

The FHS process implemented at the leaf switches includes listening to (detecting) various protocol messages originated by the endpoints. The protocols include ARP, ND, and Dynamic Host Configuration Protocol (DHCP). The endpoints transmit protocol messages such as ARP or ND discovery messages to exchange MAC addresses with other peer devices and/or with the other endpoints on the network or even with leaf gateway addresses to resolve their MAC address and IP bindings. The leaf switches 104a-104p listen for these protocol messages and add additional security by building secure local databases. The leaf switches 104a-104p build the secure local databases, such as the local databases 108a-108p, for all authenticated endpoints and provide access to the network for these authenticated endpoints.

In an example embodiment, a leaf switch obtains credentials of a newly connected endpoint and performs a search for the identifier of the endpoint in the fabric. A search for the identifier of the endpoint may be performed via a remote database query. The remote database query across the fabric includes a DAR message and a DAC message. Specifically, the DAR message is submitted to all the leaf switches in the fabric to determine if an IP address is secure in one of the local databases of the other leaf switches. If one of the leaf switches determines that the IP address is present in its local database, it transmits a unicast probe (ARP request or NS request) to the location of the endpoint identified by the local database (on the local port and the EPG of the endpoint). If the endpoint responds from the old location, the leaf switch will send a DAC message and raise an IP theft violation. If the endpoint does not respond to the probe that means the endpoint is no longer active at its old location. As such, a genuine move of the endpoint is detected. Accordingly, the leaf switch silently ignores the receipt of the DAR request. The DAR originating leaf switch times out waiting for the DAR response and secures the endpoint on the leaf switch thereafter. Any subsequent ARP or ND messages are allowed from the port of the leaf switch where the endpoint is secured.

In an example embodiment, as described above, the switches are physically connected to the servers via physical ports. When a physical move of a server or a switch occurs, the leaf switch will be disconnected from the fabric or network and the new server or a new leaf switch will be installed and connected to the fabric or the network. The physical reconnection flaps the link state of the interface at the host device and purges its ARP/ND neighbor cache. Then, the server, commonly referred to as a host device, sends an ARP/ND message to resolve a MAC address of the gateway IP address or other host in the subnet. In a virtualized datacenter network, the physical hosts are no longer the endpoints. As shown in FIG. 1, the VMs on the hosts (servers 102a-102n) are the endpoints. The VMs may be added, deleted, or moved between various servers. The IP addresses and MAC addresses are assigned to the VMs. The VMs can move often within or across virtualized datacenters. For example, the VM can move from one physical server (host) to a different physical server connected to a different leaf switch in the same datacenter fabric or even in a geographically separated data center fabric. After the move, the VM traffic hits a different leaf switch or a different physical port from the one where it was originally secured. Further, since the move is performed underneath, by a hypervisor (and a distributed virtual switch), the VMs do not initiate any of the above-described ARP or ND messages during the move That is, the VMs moves are hot moves in that the VMs do not know that they moved to a new physical server. When a hot move occurs, in various example embodiments, an additional security mechanism is provided to detect the VM move and subsequently force the VM to initiate an ARP communication or an ND communication towards the fabric so that the FHS theft detection process can be triggered to distinguish a legitimate move by the original VM or a theft attempt by a rogue device. An example embodiment provides for a graceful and immediate transfer of the VM's security policies and credentials from one leaf switch to a new leaf switch (new anchor) without any loss of network access or traffic disruption as a result of the move, provided the move is authenticated.

Figure 2:
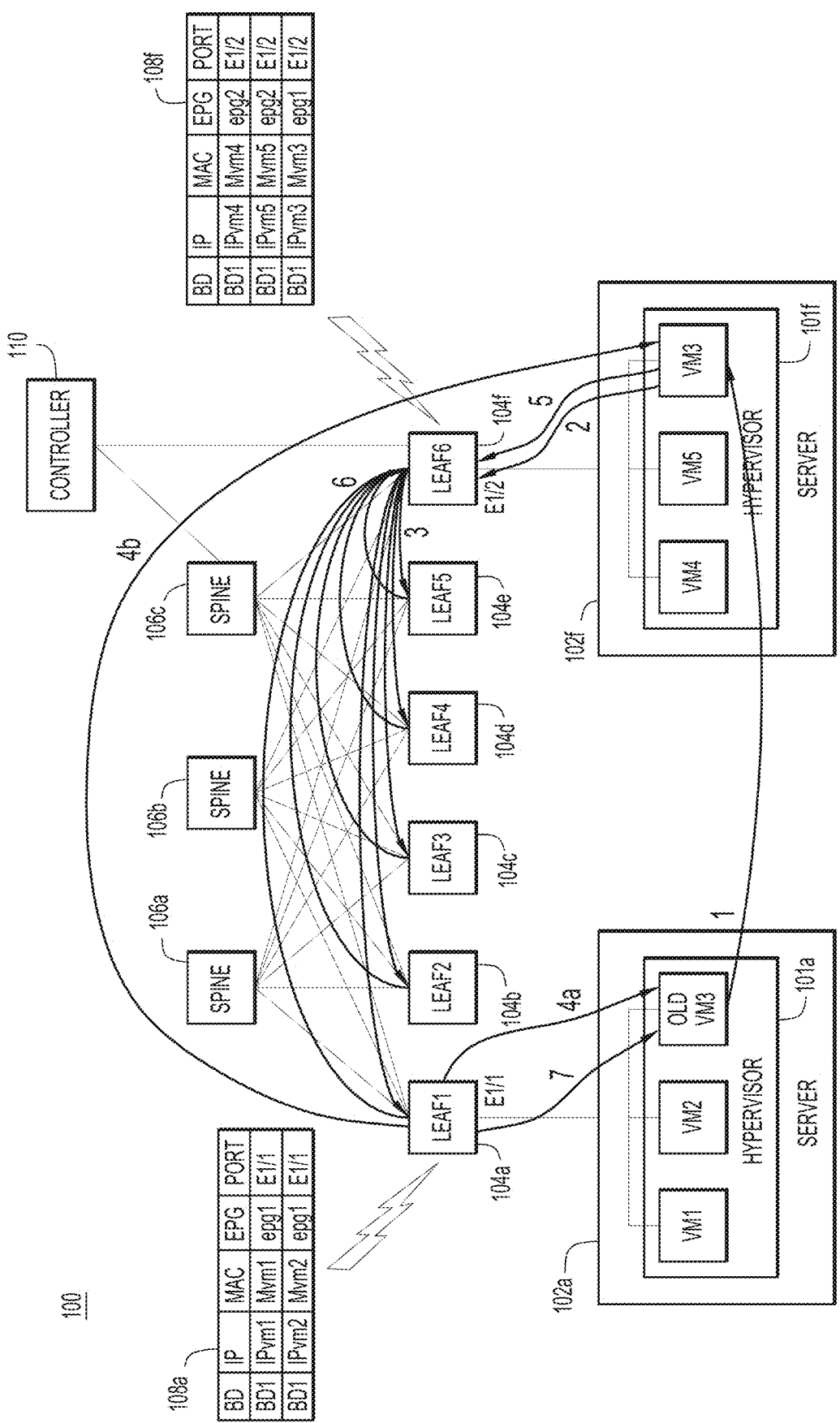
FIG. 2 is a diagram similar to FIG. 1, and illustrating detection and acceptance of a legitimate move of a virtual machine, according to an example embodiment.

Reference is now made to FIG. 2. FIG. 2 illustrates a process for detecting a legitimate move of a VM in virtualized datacenter network 100, according to an example embodiment.

As shown in FIG. 2, VM1, VM2, and VM3 are hosted by the server 102a and VM4 and VM5 are hosted by the server 102f. The server 102a serves a hypervisor for VM1, VM2, and VM3 and the server 102f serves a hypervisor for VM4 and VM5. As indicated at operation 1, the VM3 is moved from the server 102a to the server 102f. For example, an administrator performs a vMotion on the VM 3 to move the VM3 to the server 102f.

As part of the move process, the hypervisor 101f on the server 102f sends a multicast reverse ARP (RARP) request in the EPG virtual local area network (VLAN) on the uplink port connected towards the leaf switch 104f. This message contains a MAC address of the VM3. The RARP request is a secure Layer 2 IP message that only indicates that a MAC address moved to a new device but no IP address is included. The RARP request is typically sent to update the VM MAC address to the physical port mappings in the upstream physical switch's MAC address tables so the return L2 bridge traffic from these upstream switches can now correctly flow to the VM through the physical port connecting the new physical server where the VM3 is moved.

The RARP request is intercepted by the leaf switch 104f to trigger an authentication of the new VM. Specifically, the leaf switch 104f directs the RARP request to its processor for processing. The CPU extracts the MAC address from the RARP request and performs the lookup. As shown in FIG. 2, in operation 2, based on receiving the RARP request from the server 102f, the leaf switch 104f performs a lookup in a locally maintained FHS secure endpoint database cache i.e., the local database 108f.

In operation 3 of FIG. 2, since the MAC address is not found in the local database 108f, the leaf switch 104f performs a remote database query of the MAC address and sends the MAC address to all the fabric leaf switches where the Bridge Domain is deployed using a multicast DAR request with a special opcode. A remote database lookup (a remote MAC address query) is broadcasted to all the leaf switches in the fabric to obtain an IP address corresponding to or secured with the MAC address in the request. This DAR message is delivered to all leaf switches (including leaf switch 104a) in the fabric where this bridge domain is deployed.

When the leaf switch 104a receives the DAR message with the specific opcode of a mac query, the leaf switch 104a looks up its local database to check if the MAC is secured therein. If the MAC address is not found, the DAR message is ignored. However, the MAC address of the VM3 is secured in the local database 108a of leaf switch 104a and the MAC query is therefore successful by the leaf switch 104a. Accordingly, the leaf switch 104a retrieves the corresponding IP address mapping of the VM3 from its local FHS database 108a.

Once the leaf switch 104a determines both the IP address and MAC address of the VM3, the leaf switch 104a, in operations 4a and 4b shown in FIG. 2, sends a multicast flood ARP or NS (in case of IPv6) request in the bridge domain to probe the VM3 (target address as the VM3 IP address) in the network. This flooded ARP (or NS) request is delivered to VM3 at its old location, in operation 4a and at its new location on the server 102f connected to leaf switch 104f, in operation 4b.

Next, in operation 5, the VM3 on the server 102f responds to the ARP (or NS) request with an ARP (or NA if IPv6) reply. In operation 6, the ARP (or NA) reply is intercepted by the leaf switch 104f. This ARP or NA reply message intercepted at the leaf switch 104f triggers an IP Theft validating process because the VM3 is a newly seen endpoint on the leaf switch 104f. According to an example embodiment, since a VM migration will not trigger an ARP message or NA message, the ARP message or NA message is triggered by a remote network query (operations 2-5, described above).

The ARP or NA reply message intercepted at the leaf switch 104f now includes a MAC address and an IP address and an IP theft validation process can be performed. As shown in operation 6 of FIG. 2, the leaf switch 104f sends a multicast DAR Request in the VM3 bridge domain with an opcode of a remote IP query of the VM3 IP address gleaned from the ARP or NA Reply message from the VM3. This DAR request is delivered to all leaf switches (including leaf switch 104a) where the bridge domain is deployed.

When the leaf switch 104a receives the DAR request with a remote IP query for the IP address of VM3, it performs an endpoint IP address lookup in its local secure endpoint database 108a. As the VM3 IP address is locally secured, the leaf switch 104a sends a unicast ARP (or NS) probe request via port E1/1 to check for the existence of the VM3 at its old location, in operation 7. Since the VM3 already moved, no probe reply is received by the leaf switch 104a. The leaf switch 104a silently removes the VM3 endpoint entry from its local database 108a and ignore sending a DAR Response (a DAC message) as no indication of a theft attempt is found. At the same time on the leaf switch 104f, as there is no DAR response (a DAC message) received, the leaf switch 104f times out from the state of waiting for the DAR response, and secures the VM3 credentials (its IP, MAC, EPG and physical port) in its local database 108f. Thereafter, the network access to the VM3 is granted and communication to and from the VM3 is allowed via the leaf switch 104f at port E1/2. The VM3 move is successful and the VM3 is secured in the FHS enabled ACI fabric.

Figure 3:
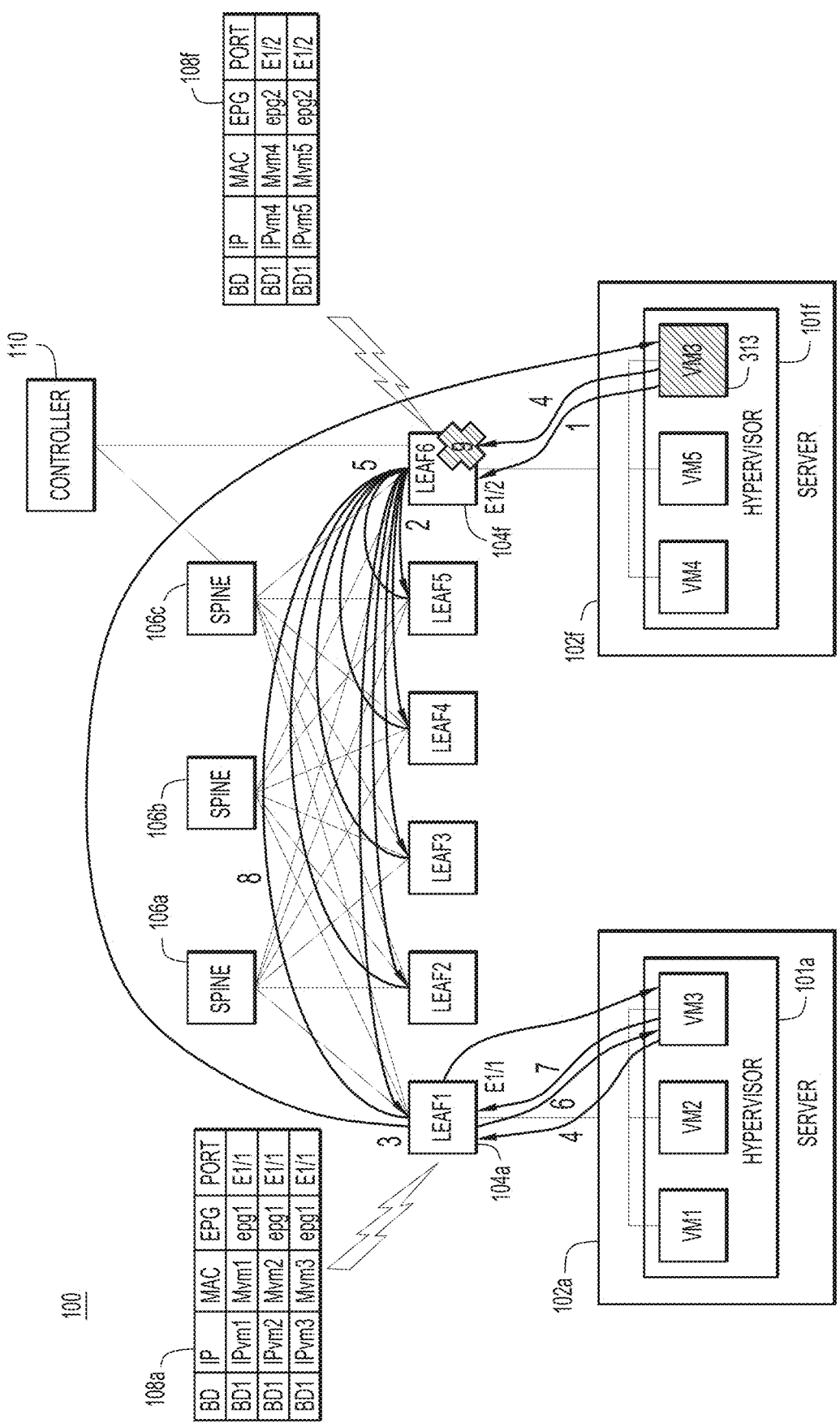
FIG. 3 is a diagram similar to FIG. 1, and illustrating a process for blocking an attempted Internet Protocol (IP) address theft, according to an example embodiment.

FIG. 3 is a diagram illustrating a process for blocking an attempted IP address theft, according to an example embodiment. FIG. 3 depicts some of example elements already discussed with reference to FIGS. 1 and 2. Since these elements were already discussed, detailed description is omitted to avoid redundancy.

As shown in FIG. 3, in operation 1, a rogue device 313 attempts to pose as VM3 and sends a fake RARP to try to steal an IP address of VM3 in order to gain access to the network. The rogue device 313 fakes a move of the VM3 and sends an RARP message having the MAC address of the legitimate VM3. The leaf switch 104f intercepts the RARP request in operation 2 and performs a local lookup in its FHS secure endpoint database cache (local database 108f) for the MAC address extracted in the RARP message. Since the MAC address is not found (not secured locally), the leaf switch 104f sends a multicast DAR Request with a specific opcode indicating a remote MAC query for the VM3 MAC address in the Layer 2 bridge domain of the VM3, in operation 2. In the DAR message, the leaf switch 104f encodes the MAC address of the VM3 as gleaned from the RARP message. This DAR message is delivered to all leaf switches (including the leaf switch 104a) in the fabric where this bridge domain is deployed.

When the leaf switch 104a receives the DAR message with the specific opcode of MAC query, it looks up in its local database 108a to check if the MAC is secured therein. Since the VM3 MAC address is secured at the leaf switch 104a, the MAC query is successful. The leaf switch 104a retrieves the corresponding IP address mapping of the VM3 endpoint from its local FHS database 108a When the IP address and the MAC address of the VM3 are known, the leaf switch 104a then sends a multicast flood ARP or NS (in case of IPv6) request in the bridge domain to probe the VM3 (target address as the VM3 IP address) in the network, in operation 3. This flooded ARP (or NS) request is delivered to a legitimate VM3 on server 102a connected on leaf switch 104a and to the rogue device 313 at the new location on the server 102f connected to the leaf switch 104f.

As shown in FIG. 3, in operation 4, both, the VM3 and the rogue device 313 respond to the ARP (or NS) request with an ARP (or NA if IPv6) reply. This ARP or NA message is intercepted at the leaf switch 104a and the leaf switch 104f, respectively. The message from the VM3 intercepted by the leaf switch 104a refreshes the secured endpoint in the local database 108a (because it is already present in the local database 108a). However, the leaf switch 104f cannot find the rogue device 313 in its local database 108f (it is not secured locally). As such, the leaf switch 104f triggers an FHS IP1 theft validating process.

In operation 5 of FIG. 3, the leaf switch 104f sends a multicast DAR Request in the VM3 bridge domain with an opcode of remote IP query of the VM3 IP address gleaned from the ARP (or NA) Reply sent by the rogue device 313. This DAR request is delivered to all leaf switches (including the leaf switch 104a) where the bridge domain is deployed. When the leaf switch 104a receives the DAR Request with the remote IP query for the VM3 IP address, it performs an endpoint IP address lookup in its local database 108a. As the VM3 IP address is locally secured and is found in the local database 108a, the leaf switch 104a sends a unicast ARP (or NS) Probe request via port E1/1 to check for an existence of the VM3 at its location, in operation 6.

Since the VM3 is present on the server 102a, the leaf switch 104a receives an ARP or a NA reply back in response to the probe, in operation 7. The leaf switch 104a immediately raises a remote IP theft violation to the administrator, for example. Further, in operation 8, since the VM3 is detected, the leaf switch 104a also sends a DAC message back to the leaf switch 104f indicating that the IP address is already secured on the leaf switch 104a. The leaf switch 104f also raises a local IP theft violation indicating the location of the rogue device 313. In operation 9, since the IP theft is detected for the rogue device 313, the rogue device 313 is not granted any access through the fabric via the leaf switch 104f and any subsequent traffic data and control data from the rogue device 313 is dropped and/or blocked.

An example embodiment described above with reference to FIGS. 1-3 depicts a single fabric topology. One of ordinary skill in the art, however, would readily appreciate that analogous example process is applicable to multi-fabric datacenter designs. According to an example embodiment, the above process is applicable to a multi-fabric environment where a VM may move from one remote site to another remote site in a virtual database. That is, the VM may move from one fabric to another fabric connected using VLAN overlaid on the public Internet using Virtual Extensible Local Area Network (VxLAN) or Datacenter Interconnect technologies, for example.

In various example embodiments, the RARP triggers an IP theft detection in the fabric when a VM move is detected, but example embodiments are not limited to the use of an RARP request Any Layer 2 data packet from the VM that contains the VM MAC address may be used According to various example embodiment, the Layer 2 data packet should include the VM MAC address at the new leaf switch where the VM gets connected after the move. Any MAC-based learning can also be used instead of the RARP request, according to capabilities of the platform.

According to various example embodiments, the techniques have been described with respect to VM moves between servers. These techniques can be applied to a VM being moved from one port to another port on same leaf switch Since, in this case, the MAC address gleaned from the received RARP request is already learned on the local leaf switch in the FHS secure database, the corresponding IP address(es) can be retrieved from the database and a unicast (index directed) ARP/ND request probe on the port where the RARP request is received can be sent. The probe will force the moved VM to generate an ARP/ND Reply at its new location. Based on the receipt of the ARP Reply on the local leaf from the new port (where the VM is moved), the regular flow of the FHS IP theft detection will occur and the VM will be gracefully moved to the new anchor port if it passes the theft detection process.

Figure 4:
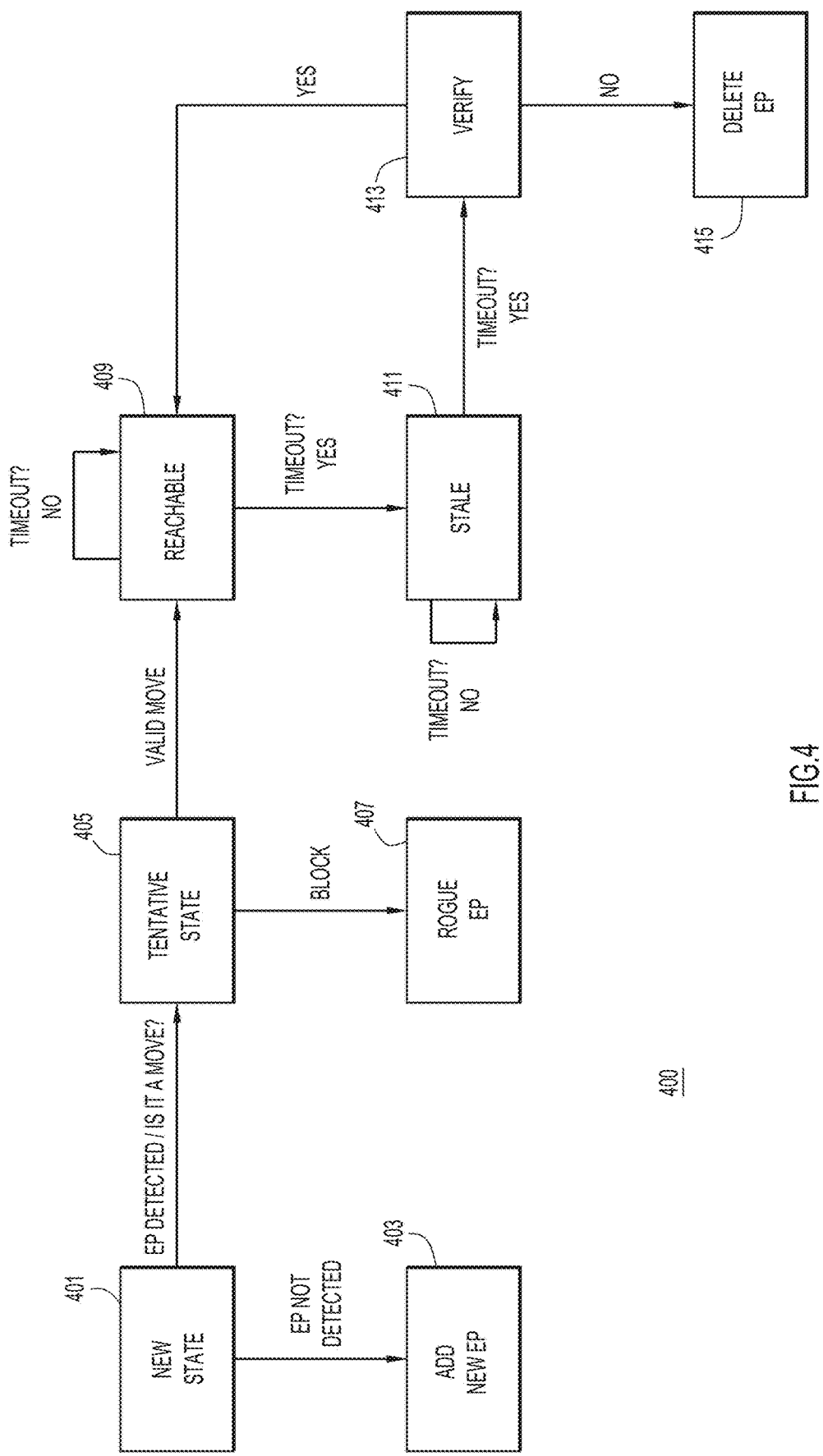
FIG. 4 is a flow diagram illustrating a state machine process executed on a leaf switch in the datacenter network of FIGS. 1-3 in order to detect and block an attempted IP address theft, according to an example embodiment.

Reference is now made to FIG. 4 FIG. 4 is a flow diagram illustrating a state machine process 400 executed on a leaf switch, according to an example embodiment. As shown in FIG. 4, each of the leaf switches implements the state machine process 400 with respect to each of the endpoints (various VMs). The VMs are hosted by the servers connected to the leaf switches. Each leaf switch implements the following main state machine states related to the FHS IP theft detection: a new state 401, a tentative state 405, a reachable state 409, a stale state 411, a verify state 413, and a delete state 415. These states are described in further detail below by way of an example. Further detailed descriptions of these main states are provided with reference to FIGS. 5A-5E.

As shown in FIG. 4, when a leaf switch detects a new endpoint not already present in its local secured database, it is assigned to a new state 401 and is processed as follows in state 403. If the endpoint is learned via RARP (or any MAC only learning mechanisms), it is not added to the secured database as there is no IP address known at this point but is only processed to trigger the theft detection using the gleaned MAC address (by broadcasting a DAR Request with MAC query in the fabric). If the endpoint is learned via a mechanism that allows to glean the IP address, the new endpoint triggers theft detection in the fabric and is also added to the local database and moved to a tentative state 405 to wait for the theft detection process to complete.

In the tentative state 405, the newly learned endpoint is undergoing theft validation processing in a fabric. For example, the leaf switch determines whether the endpoint migrated to a new location or whether a rogue device is trying to steal the identity of an already secured endpoint. If the endpoint is found and is active at an old location, then it is determined that a rogue endpoint is trying to steal identity of an existing endpoint, the tentative entry is removed from the local database and the endpoint is blocked in the rogue endpoint state 407. On the other hand, if the endpoint is not found as active at the old location, than a valid move is detected. Since the theft validation check is successful, the endpoint is moved to the reachable state 409 and obtains access to the network.

In the reachable state 409, the tentative endpoint was just secured in the leaf switch and is allowed access or an already secured endpoint was recently probed and verified (in the verify state 413) and as such remains secure in the leaf switch. The endpoint remains secured at the leaf switch in the reachable state 409 until a reachable timeout occurs. That is, after a predetermined period of time, the endpoint is viewed as stale and the leaf node transitions the endpoint to the stale state 411.

In the stale state 411, the endpoint is still secured at the leaf switch but may require a check if it is alive after a predetermined stale timeout has been reached After the predetermined stale timeout is reached, the leaf switch transitions to the verify state 413. In the verify state 413, the leaf switch probes the endpoint to determine if it is still alive. If no response is received within a predetermined verify timeout, the endpoint is viewed as dead and is deleted, in the delete endpoint state 415. That is, the endpoint access is removed and the entry corresponding to the endpoint is deleted from the FHS secure database stored at the leaf switch. On the other hand, if a response is received from the endpoint, it is placed in the reachable state 409, described above.

FIGS. 5A-5E are flow diagrams depicting operations performed for the main states of the state machine process 400 executed by a leaf switch, according to an example embodiment.

Figure 5A:
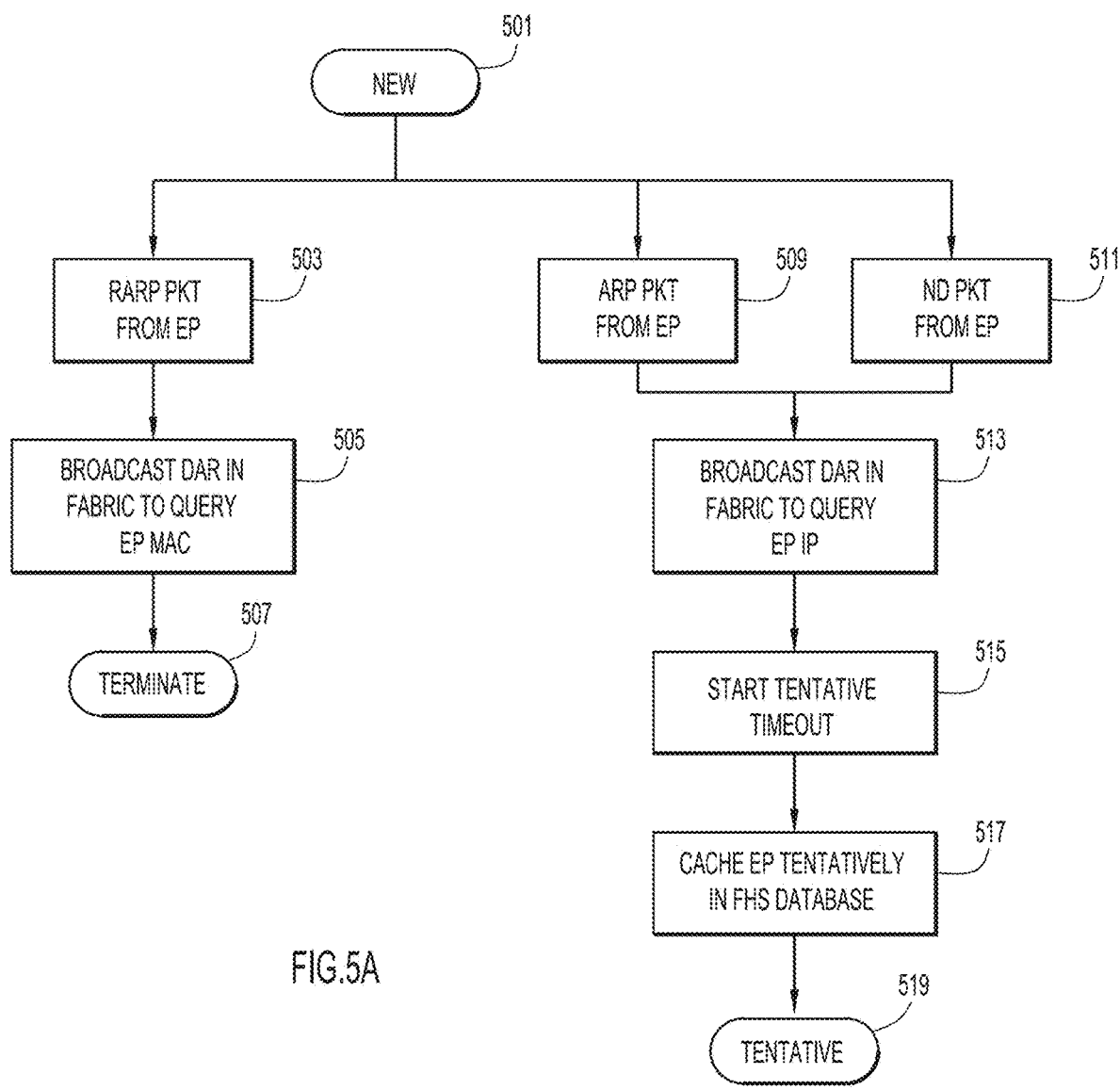
FIGS. 5A-5E are flow diagrams illustrating operations of the state machine executed by a leaf switch, according to an example embodiment.

FIG. 5A is a flow diagram illustrating operations performed during the new state of the state machine process 400 executed by a leaf switch, according to an example embodiment. In operation 501, a new endpoint (VM) is detected by a leaf switch. The new endpoint is detected by intercepting a RARP packet from the new endpoint, in operation 503. When the RARP packet is intercepted by the leaf switch, the leaf switches extracts the MAC address from the RARP packet and in operation 505, the leaf switch broadcasts a DAR message to query for the extracted MAC address through the fabric or multi-fabric environment. The DAR Message with a MAC Query is to trigger an operation on the remote leaf, if any, that has already secured this endpoint, to send a broadcast ARP or NS Probe message to probe the endpoint in the network. In operation 507, the state machine is terminated after sending DAR (with a MAC Query). If the MAC address exists within the fabric or multi-fabric environment, the endpoint identified by the MAC address will send an ARP packet or an ND packet (depending on a protocol used) having the MAC address and a corresponding IP address. As such, if the leaf switch receives from the endpoint an ARP, in operation 509 or an ND packet, in operation 511, the leaf switch broadcasts a remote IP query, in operation 513. That is, the leaf switch broadcast a DAR message i.e., a remote IP query through the fabric or multi-fabric environment. The DAR message will trigger a tentative timeout, in operation 515. The endpoint identifiers (MAC address and IP address for example) are tentatively cached in the FHS database of the leaf switch, in operation 517. The leaf switch then proceeds to the tentative state in which the theft validation processing is performed, in operation 519.

Figure 5B:
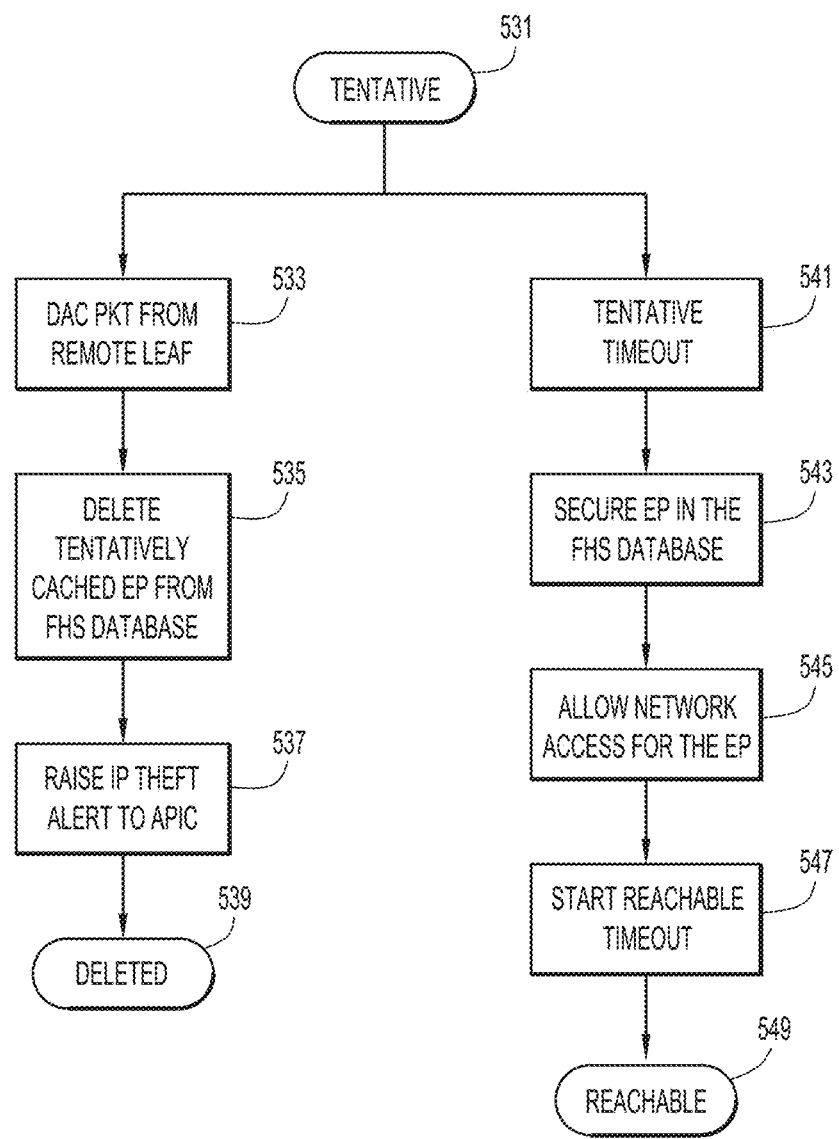

FIG. 5B is a flow diagram illustrating operations of the tentative state of the state machine process executed by a leaf switch, according to an example embodiment.

In operation 531, the leaf switch is in the tentative state waiting for a response from the remote leaf switches within the fabric or within the multi-fabric environment. If a reply is received, in operation 533, a theft is detected. Specifically, the remote leaf switches receive the DAR message described above with reference to FIG. 5A. If the IP address identified in the DAR message is present in the local FHS database of the respective remote leaf switch, this remote leaf switch sends a unicast ARP or NS probe request to check for the existence of the endpoint at the identified location. If the endpoint is secured at the identified location, the endpoint will transmit an ARP or NA reply to the respective remote leaf switch. If this remote leaf switch receives the ARP or NA reply, it transmits a DAC packet back to the switch indicating that the endpoint is already secure within the fabric or multi-fabric environment. As such, the leaf switch deletes the tentatively cached endpoint identifiers from its local FHS database, in operation 535 and raises an IP theft alert to the network controller 110 (shown in FIGS. 1-3), in operation 537. The endpoint is deleted or blocked from access in operation 539.

On the other hand, if no reply is received (no DAC packet) and the tentative timeout is reached in operation 541 indicating that the theft detection process is complete without detecting a theft, the endpoint is secured in the FHS database of the switch, in operation 543, and the endpoint is allowed access to the network, in operation 545. In other words, if a tentative timeout is reached and no DAC packets are received, the endpoint has moved to a new location and the IP address has not been stolen or an authentic endpoint is newly secured in the fabric leaf switch. Accordingly, the endpoint is allowed access to the network. Additionally, the leaf switch starts a reachable timeout in operation 547 and progresses to a reachable state, in operation 549.

Figure 5C:
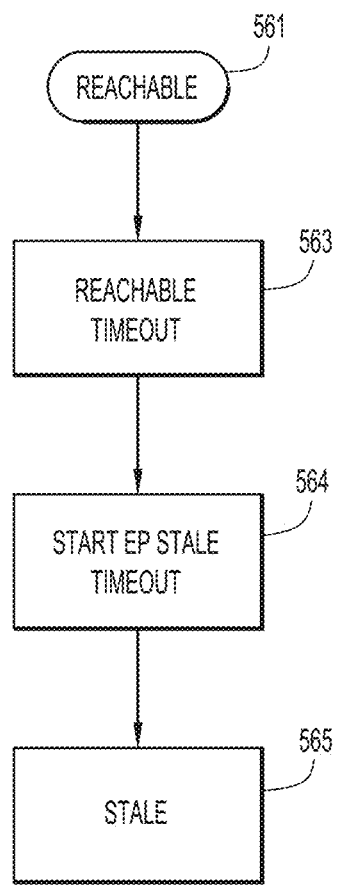

FIG. 5C is a flow diagram illustrating operations of the reachable state of the state machine process executed by a leaf switch, according to an example embodiment. In the reachable state, in operation 561, the endpoint has access to the network and is reachable. If a reachable timeout is reached in operation 563, the leaf switch starts an endpoint stale timeout in operation 564 and proceeds to the stale state, in operation 565.

Figure 5D:
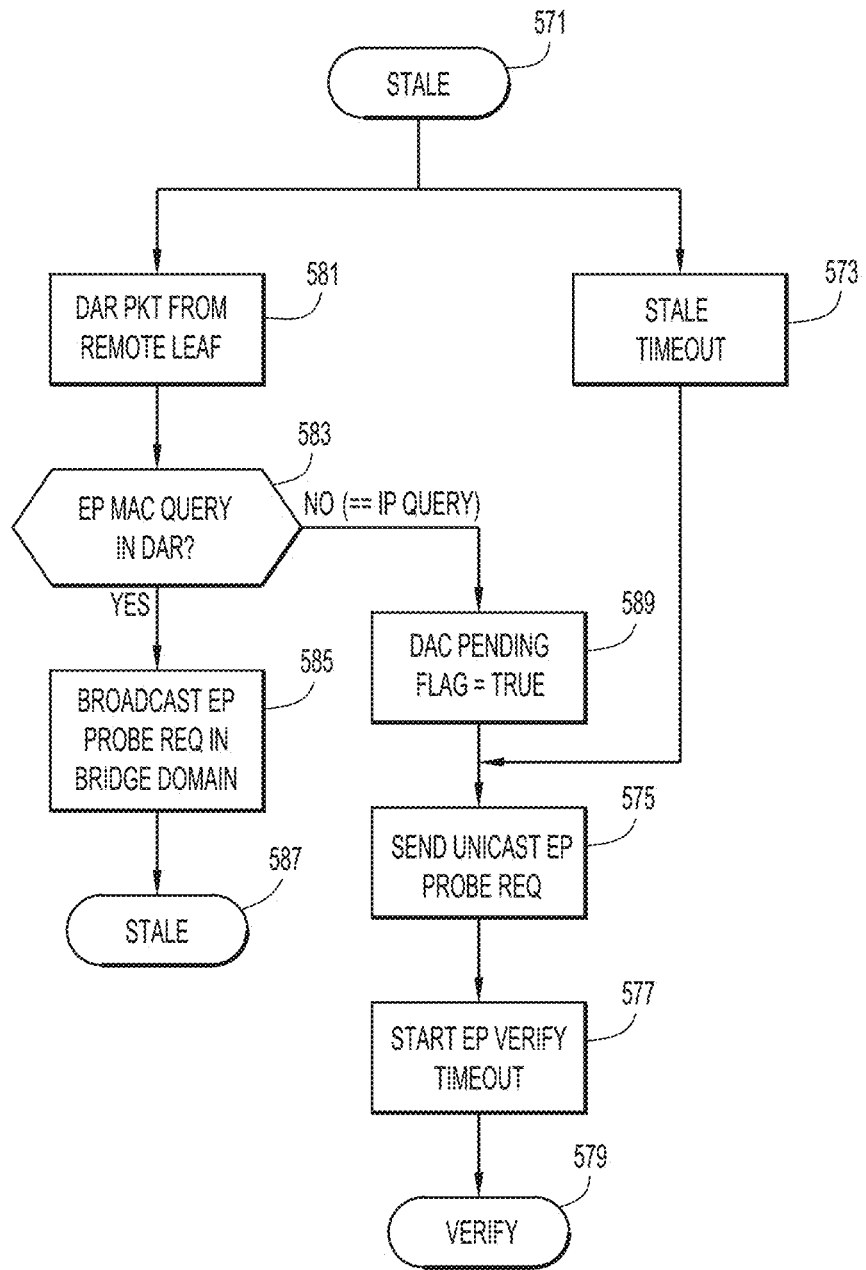

FIG. 5D is a flow diagram illustrating operations of the stale state of the state machine process executed by a leaf switch, according to an example embodiment. In the stale state 571, the endpoint remains secured at the leaf switch but further verification may be required if a stale timeout is reached, in operation 573. If the stale timeout is reached, a probe is unicasted to the endpoint to confirm that the endpoint still exists at its location, in operation 575, and an endpoint verify timeout is started, in operation 577. In operation 579, the leaf switch progresses to the verify state in which the endpoint is being verified i.e., to determine whether the endpoint is still alive.

According to an example embodiment, a DAR packet may be received from a remote leaf switch, in operation 581. The DAR packet may be broadcasted by a remote leaf switch, as explained above with reference to FIG. 5A. In operation 583, a decision is made whether the DAR packet is a remote MAC query, explained above with reference to FIG. 5A. That is, the leaf switch determines whether the message is a request for an IP address corresponding to the MAC address provided in the DAR packet. Based on a determination that the DAR packet is a remote MAC query (yes—in operation 583), the endpoint probe request is broadcasted in the bridge domain, in operation 585. That is, the leaf switch transmits a multicast flood ARP or NS request in the bridge domain to probe the endpoint(s) corresponding to the identified MAC address. This endpoint probe request triggers an ARP or NA reply from the endpoint(s), which is intercepted by the first hop leaf switch and triggers the theft validation process such as the one described with reference to FIG. 5A In operation 587, the leaf switch returns to the stale state 571 to continue to wait for a stale timeout.

On the other hand, if the DAR packet is a remote IP query (no— in operation 583), the leaf switch sets a DAC pending flag as true, in operation 589. That is, the leaf switch sets a flag to send a DAC reply if the endpoint is verified in a verify state (detailed below). The leaf switch then proceeds to send a unicast probe to the endpoint to check that it is alive at that location, in operation 575, starts a verify timeout timer, in operation 577, and proceeds to the verify state, in operation 579.

Figure 5E:
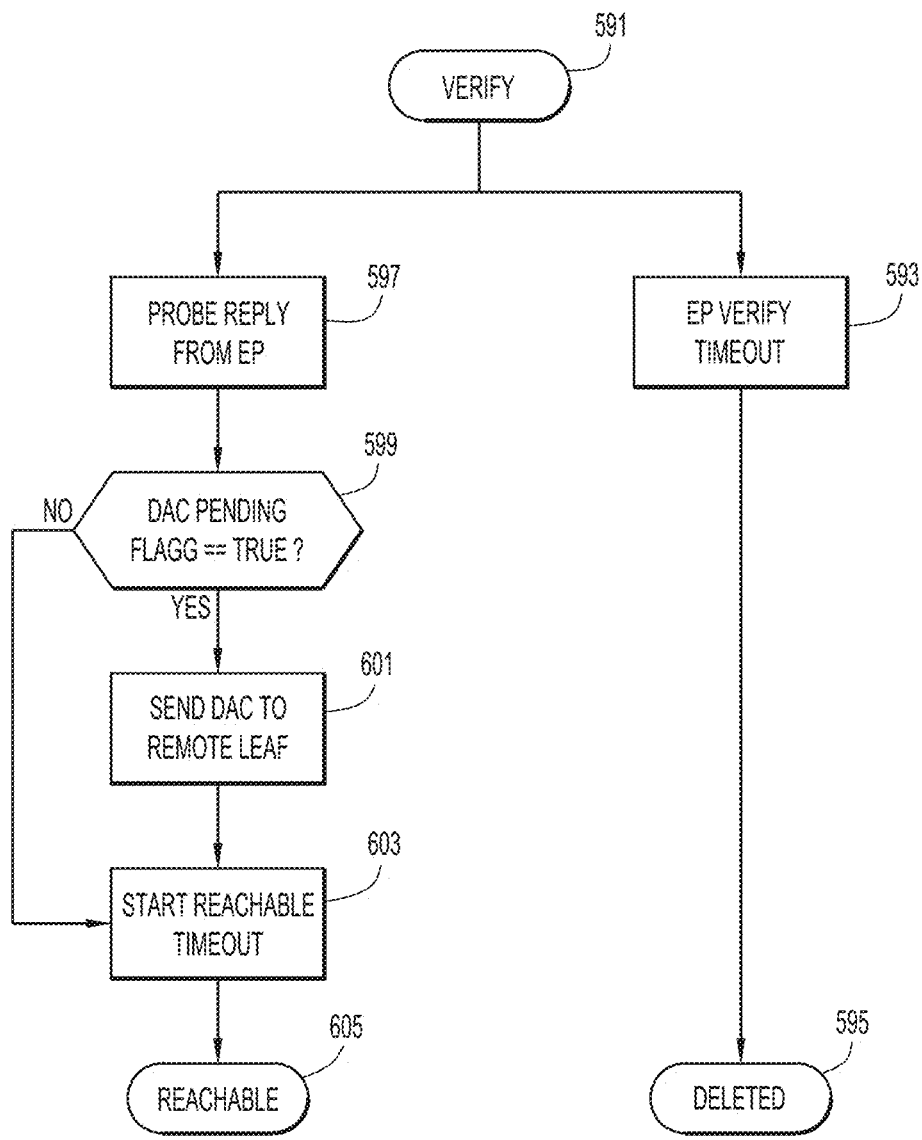

FIG. 5E is a flow diagram illustrating operations of the verify state of the state machine process executed by a leaf switch, according to an example embodiment. In operation 591, the leaf switch waits for a secure endpoint to respond to a probe request. A response would indicate that the endpoint is still alive. If a timeout is reached, in operation 593, and no reply is received, the endpoint information is deleted from the FHS database, in operation 595, and the endpoint is revoked from access privileges through the fabric. If a probe reply is received from the endpoint, in operation 597, the leaf switch checks the DAC pending flag, in operation 599. If the DAC pending flag is set to true (yes—in operation 599), then the leaf switch, in operation 601, transmits a DAC reply to a remote leaf based on which a theft violation may be raised in the tentative state, described above with reference to FIG. 5B. If the DAC pending flag is set to false (no— in operation 599), the operation 601 is omitted and no DAC replies are transmitted. In operation 603, a reachable timeout is started and the leaf switch progresses to the reachable state, in operation 605. That is, the endpoint is verified to be alive and as such, the leaf switch returns to a reachable state.

Figure 6:
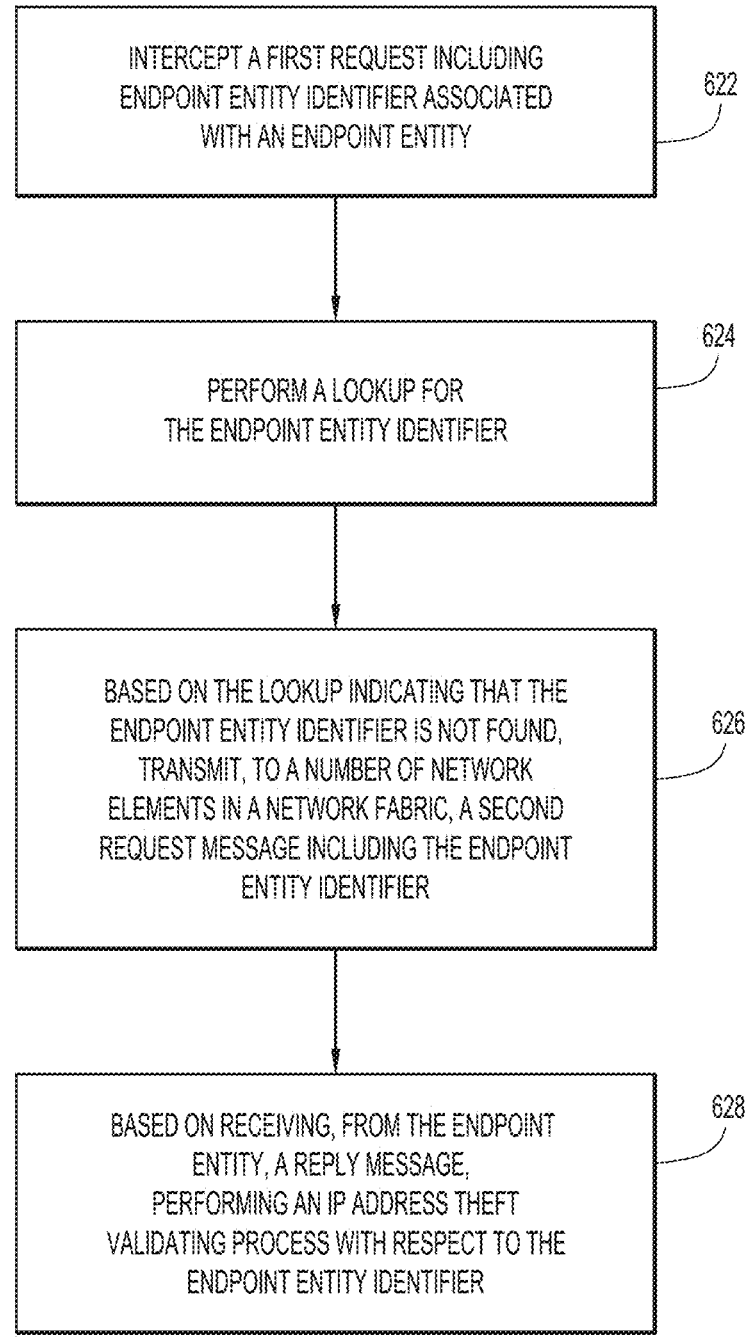
FIG. 6 is a flowchart illustrating a method of detecting a migration of a virtual machine in a virtualized datacenter, according to an example embodiment.

FIG. 6 is a flowchart for a method 620 of detecting a migration of a virtual machine in a virtualized datacenter, according to an example embodiment. The method 620 is performed by a first network element (e.g., a first leaf switch) in a network fabric.

When a VM moves from one server to another server in a virtualized datacenter, it transmits a RARP message. In operation 622, the first leaf switch intercepts a first request (such as the RARP message). The first request includes an endpoint entity identifier (such as a MAC address) associated with an endpoint entity (such as the VM).

The first leaf switch then performs a lookup for the endpoint entity identifier, in operation 624. For example, the first leaf switch searches for the MAC address of the VM in its local database. Based on the lookup indicating that the endpoint entity identifier is not found at the first leaf switch, the first leaf switch transmits a second request message, which includes the endpoint entity identifier, at operation 626. The message is transmitted to a number of other network elements in the network fabric. That is, if the MAC address of the VM is not present in the local database, the first leaf switch broadcasts a request (a remote MAC query) within a fabric or multi-fabric environment i.e., to other leaf switches (remote leaf switches) within the virtualized datacenter.

In operation 628, based on receiving, from the endpoint entity, a reply message, the first leaf switch performs an IP address theft validation/validating process with respect to the endpoint entity identifier. For example, the second request is received by the remote leaf switches. The MAC address is extracted from the second request and each remote leaf switch searches its local database for the MAC address. If the MAC address is found in the local database of a remote leaf switch, the remote leaf switch broadcasts an endpoint probe request within the network. This probe request will force the endpoint entity with the MAC address of the second request to issue a reply. The reply from the endpoint entity will include an IP address. This reply is intercepted at a first hop switch (the leaf switch). Based on the reply received by the leaf switch, the theft validating process is triggered using the IP address extracted from the reply.

According to one or more example embodiments, the first request may be a multicast reverse address resolution protocol request that includes MAC address of an endpoint. The second request message may be a remote MAC address query, and the reply message includes an IP address associated with the MAC address.

According to one or more example embodiments, the endpoint entity identifier may be an identifier of a virtual machine. The first network element and the plurality of other network elements may be switches in the network fabric and an endpoint bridge domain is deployed in the network fabric.

According to one or more example embodiments, the first network element and the other network elements may be switches within a plurality of software defined network (SDN) fabrics in a multi-fabric architecture.

According to one or more example embodiments, the first request may indicate that the endpoint entity is associated with a first hypervisor and has moved to a second hypervisor as part of a virtual machine migration process and the second request may be a multicast duplicate address request message.

According to one or more example embodiments, performing the IP address theft validating process may include retrieving, from the reply message, an IP address corresponding to the endpoint entity identifier, transmitting, from the first network element, a multicast remote IP query to the plurality of other network elements, and based on receiving a reply from the at least one network element from among the plurality of other network elements, denying access to the endpoint entity associated with the endpoint entity identifier.

According to one or more example embodiments, the performing the theft validating process may further include based on not receiving the reply within a predetermined period of time, registering the endpoint entity in a local database of the first network element.

According to one or more example embodiments, the method may further include running a state machine on the first network entity. The state machine includes a new state corresponding to a detection of a new endpoint entity attempting access to the network fabric, a tentative state in which the new endpoint entity is undergoing the IP address theft validating process, a reachable state in which at least one of the following occurs: the new endpoint entity is determined to be secure and is allowed access to the network fabric, and an existing endpoint entity is found to be alive in a verify state. The state machines further includes a stale state in which the new endpoint entity or the existing endpoint entity remains secure with the first network entity element until a first predetermined timeout is reached, and a verify state. In the verify state, based on the first predetermined timeout being reached in the stale state, the new endpoint entity or the existing endpoint entity is probed to determine whether it is still alive at a location from where the endpoint entity is original learnt, based on not receiving a probe response before a second predetermined timeout, deleting the new endpoint entity or the existing endpoint entity, and based on the receiving the probe response before the second predetermined timeout, entering the reachable state.

According to one or more example embodiments, the intercepting the first request may occur during the new state and based on not receiving the reply message, the new state for the new endpoint entity is terminated after sending the second request message (remote MAC address query).

According to one or more example embodiments, the transmitting the second request message, which is a duplicate address request message in which a MAC address of the endpoint is provided, may occur during the new state. Further, during the new state, based on receiving the reply message including an IP address corresponding to the MAC address found on at least one of the plurality of other network elements in the network fabric, the tentative state may be entered in which the IP address theft validating process is performed. This reply from the endpoint is triggered as a result of a broadcast ARP or NS probe request sent from a remote network element where the endpoint is already found secured.

FIG. 7 is a flowchart of a method 630 of triggering an IP address theft validation process of a virtual machine IP address in a virtualized datacenter, according to an example embodiment.

In operation 632, a first network element, such as a leaf switch, receives a first request message (such as a DAR packet). The first request may include an endpoint entity identifier (a MAC address) associated with an endpoint entity. For example, the first request may be a remote MAC address query that is broadcasted by a remote leaf switch that detected a new VM trying to secure access to the network via the remote leaf switch. The first request is triggered by a second network element in the network fabric receiving a multicast reverse address resolution (RARP) request. In operation 634, the first network element performs a lookup in its local database (for example in its FHS database), based on the endpoint entity identifier. For example, the first network element may extract the MAC address from the first request message and search for the extracted MAC address in its FHS database.

In operation 636, based on the lookup indicating that the endpoint entity identifier is found in the local database, broadcasting a second request message. The second request message is a probe to the endpoint entity so as to trigger an IP address theft validating process by the second network element based on a response to the second request message from the endpoint entity. For example, based on the MAC address being present in its FHS database, the leaf switch broadcasts a second request message in a bridge domain. That is, the leaf switch multicasts a probe (ARP or NS packet) forcing the VM with the MAC address included in the first request message to respond to the probe with an ARP or NA reply which would contain the IP address of the respective VM.

According to one or more example embodiments, the method may further include, based on the lookup indicating that the endpoint entity identifier is not found in the local database, discarding the request message without further action. The endpoint entity identifier is a MAC address.

According to one or more example embodiments, the IP address theft validating process includes receiving, by the first network element, a duplicate address request message with a remote IP query comprising the IP address, performing, by the first network element, an endpoint IP address lookup in the local database, based on the endpoint IP address lookup indicating a presence of the endpoint entity corresponding to the IP address, transmitting a unicast probe request to check for existence of the endpoint entity and setting a reply flag, receiving a reply, by the first network element from the endpoint entity, indicating that the endpoint is alive, based on the set flag and the received reply, transmitting by the first network element, a message indicating an IP theft violation and blocking access of the endpoint entity to the network fabric, and based on reaching a timeout without receiving the reply, removing, by the first network element, an entry of the endpoint entity from the local database so that the endpoint entity is secured at a new location.

According to one or more example embodiments, the first network element is a leaf node element of a plurality of leaf node elements in a software defined network (SDN) fabric, and the endpoint entity is one of a plurality of endpoint entities that are respectively associated with a corresponding one of a plurality of hypervisors and that communicate via the plurality of leaf node elements.

According to one or more example embodiments, the first network element is a switch connected to a plurality of endpoints entities, which are virtual machines.

According to one or more example embodiments, the first request message is a multicast duplicate address request message including a remote MAC address query triggered by the reverse address resolution protocol request indicating a move of a virtual machine from a hypervisor, and the second request message is a multicast address resolution protocol probe request or a neighbor solicitation probe request, which triggers from the endpoint entity identified in the second request, an address resolution protocol reply or a neighbor advertisement reply.

In still another embodiment, a network element (apparatus) is provided that includes a plurality of ports at which network communications are received and from which network communications are sent; a memory; and a processor coupled to the memory. The processor is operative to intercept a first request including an endpoint entity identifier associated with an endpoint entity, perform a lookup for the endpoint entity identifier, based on the lookup indicating that the endpoint entity identifier is not found, transmit a second request message including the endpoint entity identifier to a plurality of other network elements in the network fabric, and based on receiving, from the endpoint entity, a reply message, perform an Internet Protocol (IP) address theft validating process with respect to the endpoint entity identifier.

According to one or more example embodiments, the first request may be a multicast reverse address resolution protocol request including a MAC address, the second request message may be a remote MAC address query, and the reply message may include an IP address associated with the MAC address. The reply message is sent by the endpoint entity in response to a broadcast probe request sent from another network element, among the plurality of network elements, which found the endpoint identifier in a local database of the another network element as a result of the remote MAC address query.

According to one or more example embodiments, the endpoint entity identifier may be an identifier of a virtual machine, the plurality of other network elements may be switches within a network fabric, and an endpoint bridge domain is deployed in the network fabric.

According to one or more example embodiments, the first request may indicate that the endpoint entity is associated with a first hypervisor and has moved to a second hypervisor as part of a virtual machine migration process, and the second request may be a multicast duplicate address request message.

According to various example embodiments, IP theft detection for the migration of virtual machines is simple and easy to implement using FHS and protocols such as RARP, ARP, ND, DICP, and DAR/DAC. By binding together various messages and replies, IP theft is detected during VM migration in virtual data center deployments, in a cloud environment, and a multi-cloud environment. According to various example embodiments, virtual endpoint security within a single fabric and across multi-fabric architectures connected over the Internet via fabric overlays, such as virtual extensible local access network (VxLAN), is provided. According to various example embodiments, instant detection of duplicate IP address misconfigurations on the virtual endpoints connected to software defined network (SDN) fabric is provided. According to various example embodiments, visibility of IP address misconfigurations and security violations by virtual endpoints is made widely visible and may be reported to SDN controllers.

Figure 8:
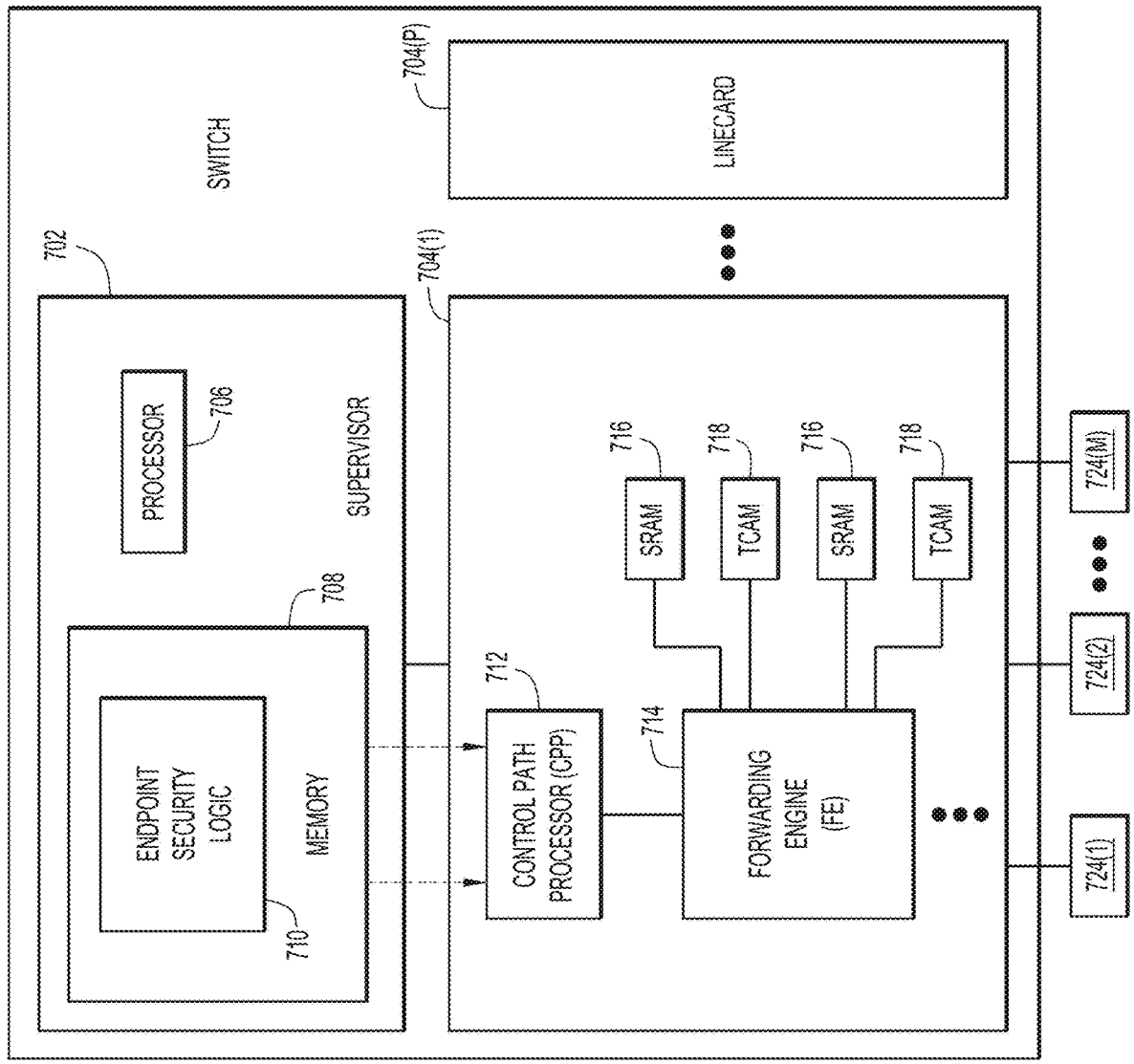
FIG. 8 is a block diagram of a switch configured to perform the method for triggering a theft validation process, according to an example embodiment.

FIG. 8 is a block diagram illustrating a network element (e.g., leaf switch) 700 configured to perform the operations described herein, according to an example embodiment.

The switch 700 may include a supervisor module 702 and a plurality of offlinecards 704(1)-704(P). The supervisor module 702 includes a processor (e.g., microprocessor or microcontroller) 706 and a memory 708. The memory 708 stores instructions for endpoint security logic 710, which are executed by the processor 706 to enable the switch 700 to perform the operations described herein. In addition, the memory 708 may store the aforementioned local database maintained by a leaf switch for identifying known endpoint entities.

The linecards 704(1)-704(P) each include a Control Path Processor (CPP) 712 configured to program one or more of Forwarding Engines (FEs) 714, which may be embodied by hardware Application Specific Integrated Circuits (ASICs). Each FE 714 in a linecard is associated with respective Static Random Access Memories (SRAMs) 716 and TCAMs 718. Traffic ingresses and egresses the leaf switch 700 at one of a plurality of network ports 724(1)-724(M) of a given linecard 704(1)-704(P). The ports 724(1)-724(M) may be a physical port of a leaf switch at which network packets are directed from the leaf switch to the server.

The memory 708 may comprise read only memory (ROM), random access memory (RAM), magnetic disk storage media devices, optical storage media devices, flash memory devices, electrical, optical, or other physical/tangible memory storage devices. Thus, in general, the memory 708 may comprise one or more tangible (non-transitory) computer readable storage media (e.g., a memory device) encoded with software comprising computer executable instructions and when the software is executed (by the controller) it is operable to perform the operations described herein.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

It is to be understood that the software of example embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of example embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of example embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of example embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, by a first network element in a network fabric, a first request message comprising an endpoint entity identifier associated with an endpoint entity, the first request message being triggered by a second network element in the network fabric receiving a multicast reverse address resolution protocol request;
   performing, by the first network element, a lookup in a local database, based on the endpoint entity identifier; and
   based on the lookup indicating that the endpoint entity identifier is found in the local database, broadcasting a second request message which is a probe to the endpoint entity so as to trigger an Internet Protocol (IP) address theft validating process by the second network element based on a response to the second request message from the endpoint entity.

2. The method of claim 1, further comprising:
   based on the lookup indicating that the endpoint entity identifier is not found in the local database, discarding the first request message without further action,
   wherein the endpoint entity identifier is a media access control (MAC) address.

3. The method of claim 1, wherein the IP address theft validating process comprises:
   receiving, by the first network element, a duplicate address request message with a remote IP query comprising an IP address;
   performing, by the first network element, an endpoint IP address lookup in the local database;
   based on the endpoint IP address lookup indicating a presence of the endpoint entity corresponding to the IP address, transmitting a unicast probe request to check for existence of the endpoint entity and setting a reply flag;
   receiving a reply, by the first network element from the endpoint entity, indicating that the endpoint entity is alive at a location where the endpoint entity is originally learned;
   based on the reply flag being set and the reply, transmitting by the first network element, a message indicating an IP theft violation and blocking access of the endpoint entity to the network fabric; and
   based on reaching a timeout without receiving the reply, removing, by the first network element, an entry of the endpoint entity from the local database so that the endpoint entity is secured at a new location.

4. The method of claim 1, wherein:
   the first network element is a leaf node element of a plurality of leaf node elements in a software defined network (SDN) fabric, and
   the endpoint entity is one of a plurality of endpoint entities that are respectively associated with a corresponding one of a plurality of hypervisors and that communicate with via the plurality of leaf node elements.

5. The method of claim 1, wherein:
   the first network element is a switch connected to a plurality of endpoint entities, and
   the plurality of endpoint entities are virtual machines.

6. The method of claim 1, wherein:
the first request message is a multicast duplicate address request message comprising a remote media access control (MAC) address query triggered by the multicast reverse address resolution protocol request indicating a move of a virtual machine from a hypervisor, and
the second request message is a multicast address resolution protocol (ARP) probe request or a neighbor solicitation probe request, which triggers from the endpoint entity identified in the second request message, an ARP reply or a neighbor advertisement reply.

7. The method of claim 1, wherein the first network element and the second network element
are switches within a plurality of software defined network (SDN) fabrics in a multi-fabric architecture and wherein the first network element is connected to a plurality of virtual machines.

8. An apparatus comprising:
a plurality of ports at which network communications are received and from which network communications are sent;
a memory; and
a processor coupled to the memory, wherein the processor is operative to:
receive, via the plurality of ports, a first request message comprising an endpoint entity identifier associated with an endpoint entity, the first request message being triggered by a network element in a network fabric receiving a multicast reverse address resolution protocol request;
perform a lookup in a local database based on the endpoint entity identifier; and
based on the lookup indicating that the endpoint entity identifier is found in the local database, broadcast a second request message which is a probe to the endpoint entity so as to trigger an Internet Protocol (IP) address theft validating process by the network element based on a response to the second request message from the endpoint entity.

9. The apparatus of claim 8, wherein the processor is further operative to:
based on the lookup indicating that the endpoint entity identifier is not found in the local database, discard the first request message without further action,
wherein the endpoint entity identifier is a media access control (MAC) address.

10. The apparatus of claim 8, wherein the processor is operative to perform the IP address theft
validating process by:
receiving a duplicate address request message with a remote IP query comprising an IP address;
performing an endpoint IP address lookup in the local database;
based on the endpoint IP address lookup indicating a presence of the endpoint entity corresponding to the IP address, transmitting a unicast probe request to check for existence of the endpoint entity and setting a reply flag;
receiving a reply, from the endpoint entity, indicating that the endpoint entity is alive at a location where the endpoint entity is originally learned;
based on the reply flag being set and the reply, transmitting a message indicating an IP theft violation and blocking access of the endpoint entity to the network fabric; and
based on reaching a timeout without receiving the reply, removing an entry of the endpoint entity from the local database so that the endpoint entity is secured at a new location.

11. The apparatus of claim 8, wherein:
the apparatus is a leaf node element of a plurality of leaf node elements in a software defined network (SDN) fabric, and
the endpoint entity is one of a plurality of endpoint entities that are respectively associated with a corresponding one of a plurality of hypervisors and that communicate with via the plurality of leaf node elements.

12. The apparatus of claim 8, wherein:
the apparatus is a switch connected to a plurality of endpoint entities, and
the plurality of endpoint entities are virtual machines.

13. The apparatus of claim 8, wherein:
the first request message is a multicast duplicate address request message comprising a remote media access control (MAC) address query triggered by the multicast reverse address resolution protocol request indicating a move of a virtual machine from a hypervisor, and
the second request message is a multicast address resolution protocol (ARP) probe request or a neighbor solicitation probe request, which triggers from the endpoint entity identified in the second request message, an ARP reply or a neighbor advertisement reply.

14. The apparatus of claim 8, wherein the apparatus and the network element are switches within a plurality of software defined network (SDN) fabrics in a multi-fabric architecture and wherein the apparatus is connected to a plurality of virtual machines.

15. One or more non-transitory computer readable storage media encoded with instructions that,
when executed by a processor, cause the processor to perform operations including:
receiving a first request message comprising an endpoint entity identifier associated with an endpoint entity, the first request message being triggered by a network element in a network fabric receiving a multicast reverse address resolution protocol request;
performing a lookup in a local database based on the endpoint entity identifier; and
based on the lookup indicating that the endpoint entity identifier is ftet found in the local database, broadcasting a second request message which is a probe to the endpoint entity so as to trigger an Internet Protocol (IP) address theft validating process by the network element based on a response to the second request message from the endpoint entity.

16. The one or more non-transitory computer readable storage media according to claim 15, wherein the instructions cause the processor to further perform:
based on the lookup indicating that the endpoint entity identifier is not found in the local database, discarding the first request message without further action,
wherein the endpoint entity identifier is a media access control (MAC) address.

17. The one or more non-transitory computer readable storage media according to claim 15, wherein the instructions cause the processor to perform the IP address theft validating process by:
receiving a duplicate address request message with a remote IP query comprising an IP address;
performing an endpoint IP address lookup in the local database;
based on the endpoint IP address lookup indicating a presence of the endpoint entity corresponding to the IP address, transmitting a unicast probe request to check for existence of the endpoint entity and setting a reply flag;

receiving a reply, from the endpoint entity, indicating that the endpoint entity is alive at a location where the endpoint entity is originally learned;

based on the reply flag being set and the reply, transmitting a message indicating an IP theft violation and blocking access of the endpoint entity to the network fabric; and based on reaching a timeout without receiving the reply, removing an entry of the endpoint entity from the local database so that the endpoint entity is secured at a new location.

18. The one or more non-transitory computer readable storage media according to claim 15, wherein the network element is a leaf node element of a plurality of leaf node elements in a software defined network (SDN) fabric and the endpoint entity is one of a plurality of endpoint entities that are respectively associated with a corresponding one of a plurality of hypervisors and that communicate with via the plurality of leaf node elements.

19. The one or more non-transitory computer readable storage media according to claim 15, wherein the network element is a switch connected to a plurality of endpoint entities and the plurality of endpoint entities are virtual machines.

20. The one or more non-transitory computer readable storage media according to claim 15, wherein:

the first request message is a multicast duplicate address request message comprising a remote media access control (MAC) address query triggered by the multicast reverse address resolution protocol request indicating a move of a virtual machine from a hypervisor, and the second request message is a multicast address resolution protocol (ARP) probe request or a neighbor solicitation probe request, which triggers from the endpoint entity identified in the second request message, an ARP reply or a neighbor advertisement reply.

* * * * *

UNITED STATES PATENT AND TRADEMARK OFFICE
CERTIFICATE OF CORRECTION

| | |
|---|---|
| PATENT NO. | : 11,757,935 B2 |
| APPLICATION NO. | : 17/736748 |
| DATED | : September 12, 2023 |
| INVENTOR(S) | : Govind Prasad Sharma et al. |

It is certified that error appears in the above-identified patent and that said Letters Patent is hereby corrected as shown below:

In the Claims

Claim 15, Column 22, Line 44, please replace "identifier is ftet found in the local database," with --identifier is found in the local database,--

Signed and Sealed this
Seventh Day of November, 2023

*Katherine Kelly Vidal*
Katherine Kelly Vidal
*Director of the United States Patent and Trademark Office*